United States Patent
Hadidi (10) Patent No.: US 12,319,590 B2
(45) Date of Patent: Jun. 3, 2025

(54) SYNTHESIS OF OLIVINE LITHIUM METAL PHOSPHATE CATHODE MATERIALS

(71) Applicant: Nano One Materials Corp., Burnaby (CA)

(72) Inventor: Lida Hadidi, Burnaby (CA)

(73) Assignee: Nano One Materials Corp., Burnaby (CA)

( * ) Notice: Subject to any disclaimer, the term of this patent is extended or adjusted under 35 U.S.C. 154(b) by 0 days.

(21) Appl. No.: 17/494,000

(22) Filed: Oct. 5, 2021

(65) Prior Publication Data

US 2022/0135427 A1   May 5, 2022

Related U.S. Application Data

(60) Provisional application No. 63/108,916, filed on Nov. 3, 2020.

(51) Int. Cl.
| | | |
|---|---|---|
| *C01G 53/82* | (2025.01) | |
| *H01M 4/02* | (2006.01) | |

(Continued)

(52) U.S. Cl.
CPC .......... *C01G 53/82* (2025.01); *H01M 4/0471* (2013.01); *H01M 4/0497* (2013.01);
(Continued)

(58) Field of Classification Search
CPC .............. C01G 53/006; H01M 4/0471; H01M 4/0497; H01M 4/5825; H01M 2004/028;
(Continued)

(56) References Cited

U.S. PATENT DOCUMENTS

| 2010/0102270 A1 | 4/2010 | Jia et al. |
| 2017/0271657 A1 | 9/2017 | Sirén |

(Continued)

FOREIGN PATENT DOCUMENTS

| CN | 101941687 | 1/2011 |
| CN | 102249210 | 11/2011 |

(Continued)

*Primary Examiner* — Daniel S Gatewood
(74) *Attorney, Agent, or Firm* — Joseph T. Guy; Patent Filing Specialist Inc.

(57) ABSTRACT

An improved method for the formation of lithium metal phosphate cathode material is provided. The process comprises:
- forming a first aqueous suspension comprising a first molar concentration of $Li^+$ and a second molar concentration of $PO_4^{3-}$;
- forming a second aqueous suspension comprising a metal source wherein the metal source comprises at least one iron source selected from the group consisting of $Fe_2O_3$, FeOOH and $Fe_3O_4$ and an organic acid, organic alcohol or salt of an organic acid;
- wherein iron of the iron source is present in a third molar concentration;
- combining the first aqueous suspension and the second aqueous suspension and allowing a precipitate to form;
- drying the precipitate; and
- calcining the precipitate thereby forming the lithium iron phosphate cathode material having a formula represented by $LiMPO_4/C$ wherein the lithium iron phosphate cathode material comprises up to 3 wt % carbon.

64 Claims, 8 Drawing Sheets

(51) Int. Cl.
*H01M 4/04* (2006.01)
*H01M 4/58* (2010.01)

(52) U.S. Cl.
CPC ....... *H01M 4/5825* (2013.01); *C01P 2002/72* (2013.01); *C01P 2004/03* (2013.01); *C01P 2006/40* (2013.01); *H01M 2004/028* (2013.01)

(58) Field of Classification Search
CPC ... H01M 4/58; C01P 2002/72; C01P 2004/03; C01P 2006/40; C01B 25/45; Y02E 60/10
See application file for complete search history.

(56) References Cited

U.S. PATENT DOCUMENTS

2020/0168909 A1* 5/2020 Talebiesfandarani ........................ H01M 4/5825
2020/0274161 A1* 8/2020 Michot ................. H01M 4/587

FOREIGN PATENT DOCUMENTS

| CN | 102074690 | 1/2013 |
| CN | 102244263 | 9/2013 |
| CN | 102437334 | 10/2013 |
| JP | 2010240513 A | * 10/2010 |

* cited by examiner

SYNTHESIS OF OLIVINE LITHIUM METAL PHOSPHATE CATHODE MATERIALS

CROSS-REFERENCE TO RELATED APPLICATIONS

The application claims priority to U.S. Provisional Application No. 63/108,916 filed Nov. 3, 2020 which is incorporated herein by reference.

FIELD OF THE INVENTION

The present invention is related to olivine lithium metal phosphate $LiMPO_4$ (LMP) cathode material wherein M represents Fe, Mn, Ni or Co and combinations thereof. The present invention is also related to improved methods for the synthesis of LMP. More specifically, the present invention is related to the synthesis of a particularly preferred LMP, which is $LiFePO_4$ (LFP), cathode material from low cost materials and with less processing than conventional solid-state or hydrothermal methods. Even more preferably the present invention is related to the improved synthesis of LMP, and particularly, LFP, comprising carbon preferably as a coating.

BACKGROUND

LMP, and more specifically LFP, is a widely used cathode material for lithium ion batteries. LFP is synthesized commercially by either a solid-state process or a hydrothermal process both of which require multiple time-consuming steps or costly precursors. Both the solid-state process and the hydrothermal process are known to form undesirable impurities. The final cathode material is typically coated with a carbon source to increase electrical conductivity thereby forming material referred to in the art as $LiFePO_4/C$ which represents carbon coated lithium iron phosphate with the understanding that the stoichiometry of the carbon is not represented in the shorthand notation $LiFePO_4/C$ or LFP/C. For the purposes of this disclosure the notation LMP/C is an analogous notation referring to $LiMPO_4/C$ which is a carbon coated lithium metal phosphate.

The solid-state process requires a homogenous mixture with uniform particle distribution. Uniform particle distribution is difficult to achieve on a manufacturing scale. Mechanically mixing and grinding a large volume of solids at high temperature is a difficult process to control in an industrial environment resulting in the formation of undesirable impurities.

The hydrothermal method requires excess LiOH and produces $Li_2SO_4$ waste as a by-product. Lithium hydroxide is a relatively expensive source of lithium and $Li_2SO_4$ is an undesirable by-product which requires recycling. The necessity for recycling $Li_2SO_4$ complicates the overall manufacturing process and increases cost. The hydrothermal method also requires the use of a high pressure autoclave reactor at high temperature which is a costly process at high volumes.

Even with the difficulty associated with the synthesis, LFP is still widely accepted across the globe as a preferred cathode material for batteries. Growth in lithium ion batteries, particularly with a LFP cathode, is expected to grow. Due to the continued awareness of the environmental impact for manufacturing processes, and the cost and difficulty associated with the synthesis of LFP, those of skill in the art have had a long standing desire for a synthetic method which can use lower cost feedstocks and require less processing. An improved synthetic process is provided herein.

SUMMARY OF THE INVENTION

The present invention is related to cathode materials comprising lithium metal phosphate comprising carbon preferably as a coating, and particularly cathode materials comprising lithium iron phosphate comprising carbon preferably as a coating.

The present invention is also related to an improved process for the manufacture of cathode materials comprising lithium metal phosphate comprising carbon preferably as a coating and more particularly comprising lithium iron phosphate comprising carbon preferably as a coating.

More specifically, the present invention is related to a process for the synthesis of lithium iron phosphate/carbon (LFP/C) materials using lower cost feedstock, or starting materials, and a simplified method with minimal processing.

A particular feature of the invention is the ability to manufacture $LiFePO_4/C$ in aqueous suspension at relatively low temperature and ambient pressure.

These and other embodiments, as will be realized, are provided in a process for forming a lithium metal phosphate cathode material comprising:

forming a first aqueous suspension comprising a metal source wherein the metal source comprises at least one iron source selected from the group consisting of $Fe_2O_3$, FeOOH and $Fe_3O_4$ and an organic acid, organic alcohol or salt of an organic acid wherein iron of the iron source is present in a first molar concentration;

forming a second aqueous suspension comprising a second molar concentration of $PO_4^{3-}$;

combining the first aqueous suspension and the second aqueous suspension followed by addition of a third aqueous suspension comprising a third molar concentration of $Li^+$; allowing a precipitate to form;

drying the precipitate; and calcining the precipitate thereby forming the lithium iron phosphate cathode material having a formula represented by $LiMPO_4/C$ wherein the lithium iron phosphate cathode material comprises up to 3 wt % carbon.

Yet another embodiment is provided in a process for forming a lithium metal phosphate cathode material comprising:

forming a first aqueous suspension comprising a metal selected from the group consisting of iron, nickel and manganese and an organic acid, organic alcohol or salt of an organic acid wherein the metal is present in a first molar concentration;

forming a second aqueous suspension comprising a second molar concentration of $PO_4^{3-}$;

combining the first aqueous suspension and the second aqueous suspension followed by addition of a third aqueous suspension comprising a third molar concentration of $Li^+$;

allowing a precipitate to form;

drying the precipitate; and calcining the precipitate thereby forming lithium metal phosphate cathode material having a formula represented by $LiMPO_4/C$ wherein the lithium metal phosphate cathode material comprises up to 3 wt % carbon.

DESCRIPTION

The present invention is related to an improved synthesis of LMP/C, and more specifically LiFePO$_4$/C, utilizing lower cost feedstock and minimal processing. More specifically, the present invention is related to a process for forming LiFePO$_4$/C using Li$_2$CO$_3$ as the lithium source and ferric oxide (Fe$_2$O$_3$), FeOOH or magnetite (Fe$_3$O$_4$) as the iron source all of which are available commercially and are preferable to LiOH and iron sulfate. Furthermore, there is no difficult to handle byproduct generated requiring recycling or disposal.

This method for synthesizing LiFePO$_4$ utilizes a nominally stoichiometric amount of Li$_2$CO$_3$ and an iron source; preferably selected from the group consisting of Fe$_2$O$_3$, FeOOH and Fe$_3$O$_4$; and can be performed in aqueous suspension at low temperature, such as below 100° C., more preferably no more than about 80° C. and in some embodiments no more than about 40° C. These advantages are significant as they require no waste treatment of Li$_2$SO$_4$. Since the process can be utilized at near ambient temperature and pressure, no specialized equipment is required thereby providing a significant advantage when compared to the hydrothermal method. In addition, since the reaction is performed in aqueous suspension, the LFP particle size can be controlled with improved uniformity of particle size. Due to low electrical conductivity of LFP material, a source of carbon can also be added in-situ, further simplifying the overall process to form LiFePO$_4$/C directly.

The process is described herein for the formation of lithium iron phosphate for convenience with the understanding that iron can be replaced on an equal molar basis with nickel salt, manganese salt, cobalt salt, or combinations thereof to achieve, by the same process, an olivine lithium metal phosphate, referred to herein as LMP having the formula:

LiFe$_x$Ni$_a$Mn$_y$Co$_z$PO$_4$ wherein $x+a+y+z=1$ wherein:

$0 \leq x \leq 1$ more preferably $0.5 \leq x \leq 1$ and most preferably $0.9 \leq x \leq 1$;

$0 < y \leq 1$ more preferably $0 \leq y \leq 0.5$;

$0 < z \leq 1$ more preferably $0 \leq z \leq 0.5$; and $0 < a \leq 0.1$.

Carbon, preferably as a coating, is desirable to obtain good electrochemical performance such as electrical conductivity, tap density, lithium ion diffusion, optimum particle size and phase purity. Carbon content also controls crystal growth of the LMP during calcination with particle size being inversely correlated to carbon content. The tap density is also inversely correlated to carbon content. Furthermore, at high carbon content impurities appear due to the reduction of iron. If the carbon content is insufficient impurities are formed due to the oxidation of iron. A final carbon content of at least 1 wt % to no more than 3 wt % is preferred to achieve optimum conductivity with sufficient tap density and particle size. Most preferably the carbon content is at least 1.3 wt % to no more than 2.5 wt % with 1.4 to 1.7 wt % being most preferred. Above about 2 wt % carbon content the electrical conductivity is not appreciably improved and as the carbon coating thickness increases the lithium ion diffusion rate can be compromised. For these reasons, and to maximize tap density, it is preferable to limit carbon content to no more than approximately 2 wt % and more preferably no more than approximately 1.7 wt %.

The method of synthesis includes the following steps. A stoichiometric amount of Li$_2$CO$_3$, preferably up to about 5% excess by mole, is added to the, preferably deionized, water to produce a carbonate suspension. A phosphate salt is added to the deionized water separately from the Li$_2$CO$_3$ suspension. The phosphate salt is preferably selected from the group consisting of (NH$_4$)$_3$PO$_4$, (NH$_4$)$_2$HPO$_4$, NH$_4$H$_2$PO$_4$ and H$_3$PO$_4$ with NH$_4$H$_2$PO$_4$ being preferred in some embodiments, however, H$_3$PO$_4$ is preferred if it is desirable to minimize ammonia as a product of calcining. The iron source; preferably in the form of Fe$_2$O$_3$, FeOOH or Fe$_3$O$_4$; is added to the suspension comprising phosphate while mixing. A carbon source is added to the H$_3$PO$_4$/Fe$_2$O$_3$ suspension upon continued mixing preferably for at least about 3 minutes to no more than about 2 hours with about 5 minutes to no more than 15 minutes being suitable for demonstration of the invention. The Li$_2$CO$_3$ suspension is added dropwise and mixed for 1-24 hours and more preferably about 2 to about 4 hours, preferably at less than 100° C. and more preferably at about 40° C. The carbon source, preferably in the form of a carbohydrate, functions as a reducing agent to prevent oxidation of Fe(II) to Fe(III) and acts as a carbon source to increase conductivity of the final LiFePO$_4$ material. Anhydrous acids can also be used in place of hydrated acids if desired.

A particularly preferred order of addition of reactants is: phosphoric acid followed by addition of the iron source which is followed by the carbon source, preferably oxalic acid and/or citric acid, followed by lithium carbonate. If the reactants are added out of this order the lithium reacts kinetically faster with the phosphate anion than the iron oxide producing unwanted Li$_3$PO$_4$ or Li$_4$P$_2$O$_7$. Oxalic and or citric acid helps buffer the lithium to minimize these undesired reactions. The addition of lithium salt in the reactant mixture before drying ensures a homogeneous distribution of lithium in the crystals and may contribute to reduced firing times in the calcination step. If added at the beginning of the reaction most of the oxalic and citric acids is consumed, during the reaction to form lithium oxalate and iron oxalate, resulting in less carbon content in the final product and a cathode having lower capacity. Higher capacity and carbon content are observed for the final material when citric and/or oxalic is added at the end of reaction.

Figure 6:
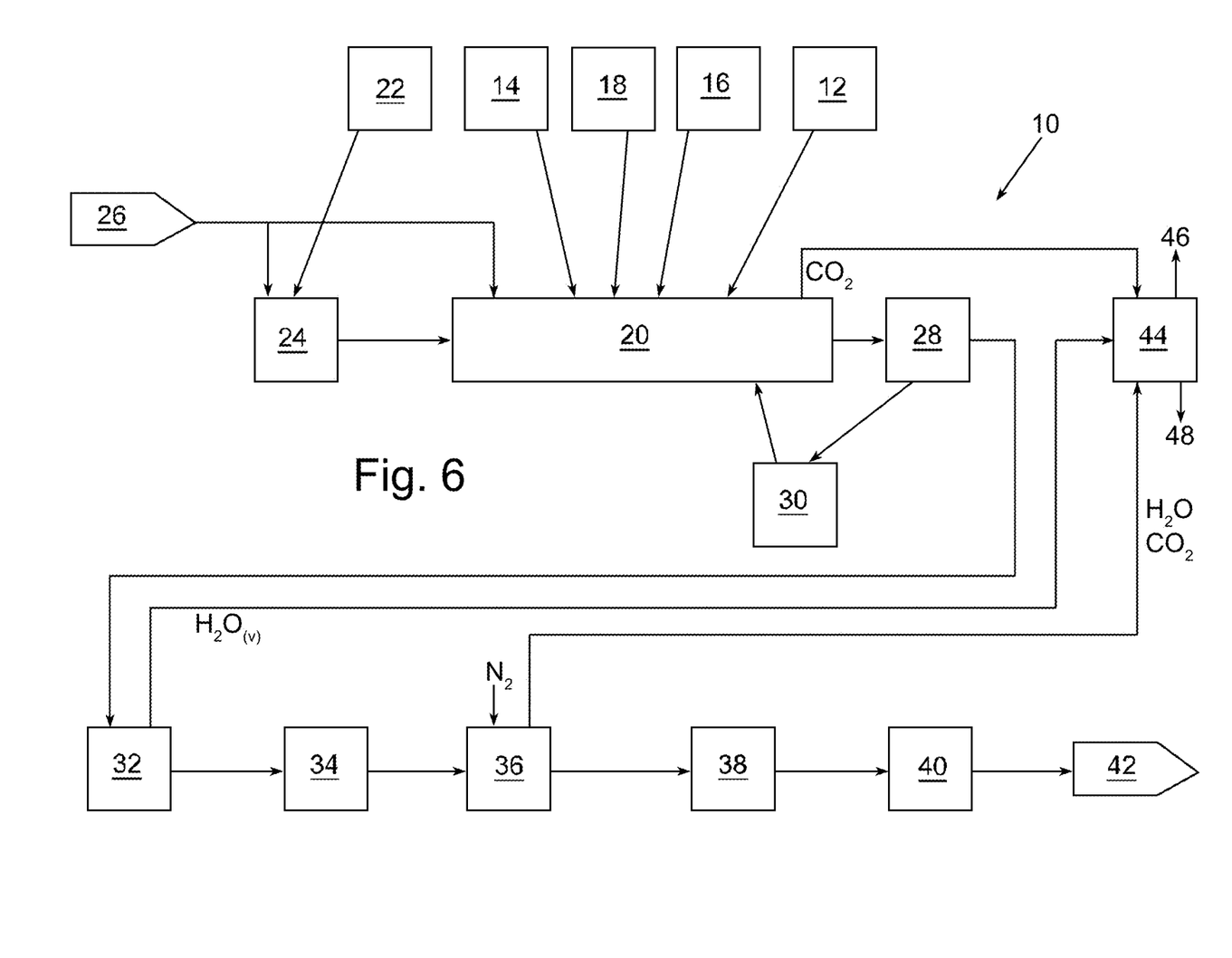
FIG. 6 is a flow chart representation of an embodiment of the invention.

An embodiment of the invention will be described with reference to FIG. 6 wherein a flow chart representation, 10, of the method of forming LMP is provided. In FIG. 6 the phosphoric acid source tank, 12, iron source tank, 14, and carbon source tanks, 16, are all arranged to feed into a stirred reactor tank, 20. A lithium carbonate storage tank, 22, optionally feeds into a lithium carbonate dispersion reactor, 24, wherein the lithium carbonate dispersion reactor feeds into the stirred reactor tank. Alternatively, the lithium carbonate storage tank also functions as a lithium carbonate dispersion reactor which feeds into the stirred tank reactor. A water source, 26, which is preferably a deionized water source, feeds into the stirred tank reactor. During the reaction in the stirred tank reactor carbon dioxide, and any other volatile reaction product is allowed to escape, preferably to a scrubber, 44, preferably comprising a vent, 46, and a blowout to disposal port, 48. After the reaction is complete the contents of the stirred tank reactor can be fed to a wet mill, 28, the purpose of which is described elsewhere herein, with optional circulation through a magnetic separator, 30. Wet milled material is fed to a dryer, 32, as described elsewhere herein. The dried powder is deagglomerated, 34, before entering the calcining kiln, 36, for calcining, optionally with inert gas, as detailed elsewhere herein. The dried powder is optionally passed through a dryer, 38, such as a jet mill and optionally passed through a magnetic separator, 40, resulting in LMP product at 42.

It is preferable to minimize the use of water to reduce drying costs. A 40% solids content is suitable for demonstration of the invention. Further increases in solids content is suitable with the upper limit of solids content being a solids content sufficient to make pumping of the slurries inefficient.

$FeC_2O_4$ can be used as the iron source but it is not preferred. With $FeC_2O_4$ as the iron source a $Li_3PO_4$ impurity phase is observed after calcining if the reaction time is below about 5 hours. A reaction time of up to 48 hours can be employed, however, there is no advantage provided by allowing the reaction to proceed beyond about 24 hours. If $Fe_2O_3$ or $Fe_3O_4$ are used, a shorter time can be employed.

It is particularly preferred that $Fe_2O_3$ supply has a low manganese content. Particularly preferred is no more than 2000 ppm manganese with no more than 1500 ppm manganese being particularly preferred. A manganese concentration of about 2000 ppm in the $Fe_2O_3$ results in about 600 ppm manganese in the final cathode material. Ferric oxide ($Fe_2O_3$), wherein iron is $Fe^{+3}$, is a preferred iron source for the reaction. Ferric oxide is typically widely available at a lower cost, per mole of iron, than iron oxalate or iron sulfate. In ferric oxide the iron is in the Fe(III) oxidation state thereby minimizing the necessity for inert air purge during the synthesis and the Fe(III) is less sensitive to pH. A particular feature of using ferric oxide is the lower volume of water required for the synthesis. Synthesizing the oxide precursor with ferric oxide requires only about 33 vol % of water relative to a synthesis using iron oxalate, for example. The use of less water decreases the drying demand thereby allowing for evaporative drying, spray drying or thin-film drying at much larger scales than available with higher water content on a commercial scale.

FeOOH can be used as the iron source. FeOOH is available commercially at extremely high purity but at a premium cost to $Fe_2O_3$. When LFP of extremely high purity is required, FeOOH can be used. One method is to simply substitute FeOOH in the reaction stoichiometrically. Alternately, FeOOH can be calcined to $Fe_2O_3$.

Magnetite, $Fe_3O_4$, may be used as the iron source. $Fe_3O_4$ is commercially available at high purity as it is used in the magnetic recording industry.

The pH of the suspension is low during reaction and control is not necessary. The pH is typically about 1.0 to about 1.7.

After the reaction of the iron salt, phosphate salt and organic acid is complete the reaction suspension is then dried to form a dried powder referred to herein as a precursor.

Acid salts of nickel, manganese and cobalt, wherein the metal is in the +2 oxidation state is a preferred source of metal if nickel, manganese and/or cobalt are included. Oxalate salts of manganese, nickel and/or cobalt are mentioned as exemplary.

Particularly preferred carbon sources are organic acids, particularly carboxylic acids, and more particularly di-carboxylic acids or tri-carboxylic acids. Di- and tri-carboxylic acids with less than about 10, preferably alkyl, carbon atoms are most preferred. Particularly preferred acids are selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, isocitric acid, aconitic acid, propane-1, 2,3-tricarboxylic acid and sucrose. Citric acid and oxalic acid are preferred due to their low cost and wide spread availability. Particularly suitable carbon sources include oxalic acid, citric acid or polyvinyl acid with oxalic acid or a mixture of citric and oxalic acid being particularly suitable. Oxalic acid improves handling properties of reaction slurry. The reaction without oxalic acid tends to have insufficient carbon after firing. The reaction slurry without oxalic acid becomes thick and viscous as shown in photo's to right when heated on a hot plate; this has implications on the ease of drying of the material. Polyvinyl alcohol is also a suitable carbon source.

Organic acids are preferred with citric acid monohydrate ($C_6H_8O_7$—$H_2O$) and oxalic acid dihydrate ($H_2C_2O_4$-$2H_2O$) being particularly preferred.

The precursor can optionally be ball milled for a short period of time, such as less than 4 hours, to produce a more uniform and higher tap density powder if desired. Ball milling can be done with alumina, however, when alumina is used the material may be contaminated with small amounts of material from the ball media and jar. Zirconia is a particularly preferred ball media for ball milling. Wet milling, with circulation, at about 55-60° C. allows $Fe_2O_3$ in phosphoric acid suspension to be converted to white iron phosphate, after some incubation time. It is preferable that the wet milling be no longer than 30 minutes in duration.

The method of drying can impact properties of the ultimate cathode material. Thin-film drying and evaporative drying provide a final product with a electrochemical performance which does not appear to be appreciably altered by the drying process. Evaporative drying is advantageous however, due to the varying solubility of reaction components, it is preferable to mix the precursor suspension during drying.

A particularly suitable drying method for demonstration of the invention incorporates a heated drum dryer comprising a heated drum, preferably an internally heated drum, with an alternate heat source such as infrared, laser heat or UV heater external to the drum. The alternate heat source spot heats the material on the surface opposite the drum to change properties or cause a reaction at a certain material dryness.

Differential scanning colorimetry (DSC) and Thermogravimetric analysis (TGA) of the LFP precursor powder dried by thin film methods has a number of reactions occurring during different temperature steps. The material initially becomes very sticky as it dries. As the material temperature is raised above a critical temperature additional alterations occur which make the material less sticky and preferably not sticky. The additional alterations are hypothesized to be a loss of waters of hydration, however other reactions and phase changes are possible. A drum dryer is a suitable means to dry this material, but a drum dryer surface operates at the constant temperature of the drum which is heated by a primary heating source such as a heating fluid which is typically hot oil, steam, etc. The primary heating source makes full control of the heating profile difficult or impossible. Alternate heat source or sources provide radiant heat to the surface of the rotating drum thereby allowing the temperature profile experienced by the material to be controlled. This can have advantages in preventing unwanted reactions or phase changes by kinetically limiting the time the material spends at temperatures particularly those temperatures in which adverse reactions or phase changes occur. Additionally, the material might be "popcorned" off of the surface just after drying thereby forming a powder. In contrast, the material is normally simply scraped off the drum or, if the dried material does not adhere adequately to the surface of the drum, the dried material falls off of the drum by gravity. By applying intense heat at a certain location, such as a narrow line formed by a tangent plane to the drum, the rapidly evolved gasses formed by phase change of water or other compound and/or reactions or chemical reactions cause the material to be "exploded" off of the surface.

Thin film drying can be accomplished as a batch process by drying the product with conduction from a surface with a temperature of about 150-250° C. The material remains affixed to the surface for a time of about a ms to seconds before being scraped off the surface. This allows the material to become crystalline and not sticky after drying. In this process, additional waters of hydration are removed and some partial reactions, such as oxalate decompositions and iron phosphate allotrope conversions, may occur. Drum drying is a continuous variation of thin film drying with similar behavior.

Evaporative drying in a tray results in similar behavior to the thin film drying methods. The slurry is dried in a reactor on a beaker while mixing at about 90° C. until "muddy" then the mud is transferred to a drying convection oven overnight at about 90° C. The crystallinity is similar to the thin film drying, based on X-ray Diffraction (XRD), and the product behavior has similar electrochemical properties. This low temperature crystallinity indicates that the crystallinity is formed over time at about 90° C. temperature.

Based on DSC and TGA studies of the materials, there are a number of reactions occurring at various temperatures that are important to the end-product. Operation of the dryer must be maintained at the optimal conditions so that desired reactions occur in the dryer. Reactions of interest include dehydration, or loss of waters of hydration, and partial reaction of phosphate with iron to form various iron phosphate allotropes such as strengite, metastrengite I and metastrengite II.

Spray drying into a relatively low temperature drying air atmosphere results in a powdered material. While not bound by theory, it is hypothesized that staying below the glass transition temperature Tg of some of the components of the mixture suitable powder can be obtained. An inlet temperature of about 150-180° C. and outlet temperature of about 110-130° C. is suitable for demonstration of the invention.

The precursor is fired to obtain the LMP/C, and preferably LiFePO$_4$/C. A calcining temperature of 620-740° C. under inert gas is preferred. Above about 740° C. Fe$_3$P impurity can be observed. Firing, or calcining, of the powder at about 660-720° C., preferably for 1-10 hours and optionally under N$_{2(g)}$ is exemplary for demonstrating the invention. Below about 1 hour calcining may be incomplete. Beyond about 10 hours the oxide begins to degrade. A calcining time of about 4 hours to about 10 hours is preferable. It is preferable that the inert gas comprise less than 0.01 wt % oxygen.

Lithium oxalate decomposes in the range of 556-585° C. though it partly decomposes to Li$_2$CO$_3$. By converting Li$_2$CO$_3$ to lithium oxalate, the decomposition can be effected in the temperature range that LFP is fired within a preferred range of 670-730° C. The Fe in LFP likely catalyzes the decomposition of Li$_2$CO$_3$ and lithium oxalate in this temperature window as well.

Lower temperature firing, such as about 670° C., may allow a metal rotary kiln to be used instead of roller hearth with saggars without resulting in metal contamination of product and better product quality due to an increase in gas exposure to the powder.

Optimum firing is between 670 and 720° C. for a time of between 4 and 10 hours. Firing time is a more important parameter than temperature in determining production cost as this is the limiting factor in furnace throughput.

Decomposition products are not necessarily monitored since the primary decomposition products are gases at calcining temperature. Expected decomposition products include NH$_3$, CO$_2$, CO and H$_2$O.

Primary particle sizes achieved by the synthesis are typically about 200 to 400 nm in diameter with a sufficiently uniform particle size distribution.

Post calcination milling is typically not required when ferric oxide is used.

The material from the thin film dryer is polydisperse in size. This material requires deagglomeration before firing. This can be performed by any of several milling methods. The target particle size for the deagglomerated powder is between 1-10 microns (d90 by mass) with as uniform a particle size distribution as possible.

Ball milling is not preferred as it compacts a fraction of the particles and results in a very polydisperse particle size distribution. Ball milling also results in a high surface area material which is not typically desired in the end product for lithium ion batteries though it may be useful for other applications such as capacitors.

Wet bead milling with moderate energy input and short residence time is particularly preferred to make high quality LFP. Wet milling with 1-1.2 mm zirconia beads, at a residence time about 5-10 min/kg of final LFP product is suitable for demonstration of the invention.

Tip speed can be as low as 10-15 m/s, which is lower than typically used for this type of operation, thereby being more energy efficient than operation at higher tip speed. The slow tip speed also reduces wear and tear on the beads and machine. Lower tip speed also reduces contamination of the product by grinding bead destruction. The tip speed of a wet bead mill is approximately constant as the wet bead mill is scaled up to commercial scale units.

It is preferable to rotate the powder while calcining or firing. Firing the material in a saggar results in gradients of material quality through the saggar due to each unit volume of the sagger experiencing different temperature and atmosphere histories during the firing cycle. This results in material with an average performance below optimal. Large differences in carbon content are observed between the top, middle and bottom of the saggar, especially at deep sagger loadings. To produce uniform high-quality material, the ideal firing method includes a method to agitate the material as it is fired. This can be accomplished practically in a rotary kiln or in a rotating ceramic or metal capsule with open ends and a geometry to contain the material as it rotates in the kiln.

Similar electrochemical capacity is obtained by material fired in a rotary capsule compared to saggar fired material. The capsule is found to have more uniform properties, and theoretically the capsule material is expected be able to achieve higher overall performance when optimally fired.

The reaction of the iron salt and phosphate salt can be done in inert gas to prevent oxidation of Fe(II). For the purposes of the instant invention an inert gas is defined as a gas which will not oxide Fe(II). Suitable gases include, without limit, include $N_2$ and noble gases. $N_2$, preferably with less than 0.01 wt % oxygen, is particularly preferred due to the relatively low cost and wide spread availability. A particular advantage of the invention with $Fe_2O_3$ as the iron source is that inert atmosphere is not required.

Throughout the description a stoichiometric amount refers to the addition of a reactant in an amount sufficient to form the resulting product in the proper stoichiometry within experimental error. A stoichiometric amount, as defined herein, is at least within 5 mole % of the theoretical stoichiometric equivalent desired and preferably within 1 mole % of the theoretical stoichiometric amount desired. By way of example a stoichiometric equivalent of lithium and phosphate would preferably have a molar ratio of lithium to phosphate from 0.95:1 to 1.05:1 and preferably from 0.99:1 to 1.01:1.

The process is easily scalable for large scale manufacturing using presently available equipment and/or innovations of the present industrial equipment. The inventive cathode is incorporated into a battery wherein the battery comprises an anode, which is not limited herein, a separator, which is not limited herein, and a dielectric, which is not limited herein. The formation of a battery from an inventive cathode as described herein, an anode, a separator and a dielectric is well known to those of skill in the art and further elaboration is not necessary herein.

EXAMPLES

Suspension 1 was prepared by adding 230.5 grams of $H_3PO_4$ to 0.7 L of deionized water and the suspension was mixed for 20 minutes. 159.7 grams of $Fe_2O_3$, 126.0 grams of oxalic acid and 52.5 grams of citric acid were added to the suspension and the suspension was stirred for 1-24 hrs. The suspension had a pH of about 1.3-1.5.

Suspension 2 was prepared by adding 77.6 grams of $Li_2CO_3$ to 0.8 mL of deionized water in a separated beaker and the suspension was mixed for about 20 minutes.

Suspension 2 was added drop wise to the Suspension 1 over a period of about 1 hr. It is preferable to add the lithium carbonate containing suspension slowly to avoid foaming due to evolution of $CO_2$. The combined suspensions were mixed aggressively at 40° C. for up to 24 hours preferably while covered to avoid evaporation of water resulting in a reaction suspension.

The reaction suspension was dried by spray drying at a temperature of about 176° C. for the inlet temperature and 120° C. for the outlet temperature. X-ray diffraction (XRD) of the dried powder indicated the presence of $Fe_2O_3$ and other lithium compounds, of the general formula $Li_xC_yO_z$, which are all converted during calcination to the final $LiFePO_4/C$. The powder was then fired at about 670° C. for about 4 hours under $N_{2(g)}$ in a tube furnace resulting in $LiFePO_4/C$.

While not limited by theory, the $H_2C_2O_4$ is hypothesized to act as a reducing agent and a dispersing agent of $Fe_2O_3$ and $Li_2CO_3$ in water. The particle size, morphology, and surface area of the final $LiFePO_4/C$ material can be controlled by altering the synthesis conditions such as time, temperature and duration time.

Figure 1:
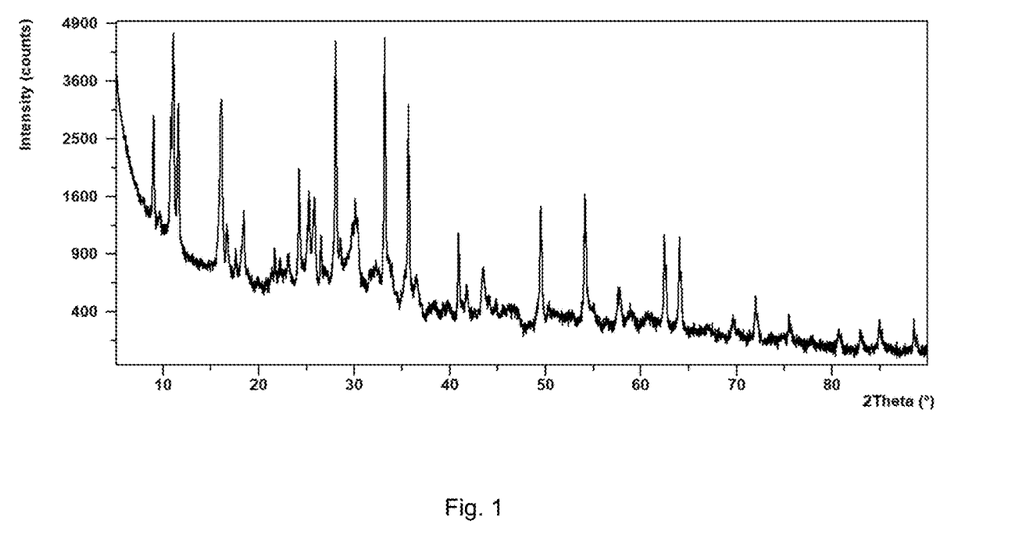
FIG. 1 is a powder XRD pattern of precursor material after drying.

FIG. 1 shows the XRD pattern of evaporative precursor material prior to calcination. The main diffraction peaks index as iron oxide ($Fe_2O_3$) and other lithium compounds which are all converted during calcination to the final $LiFePO_4/C$ cathode material.

Figure 2:
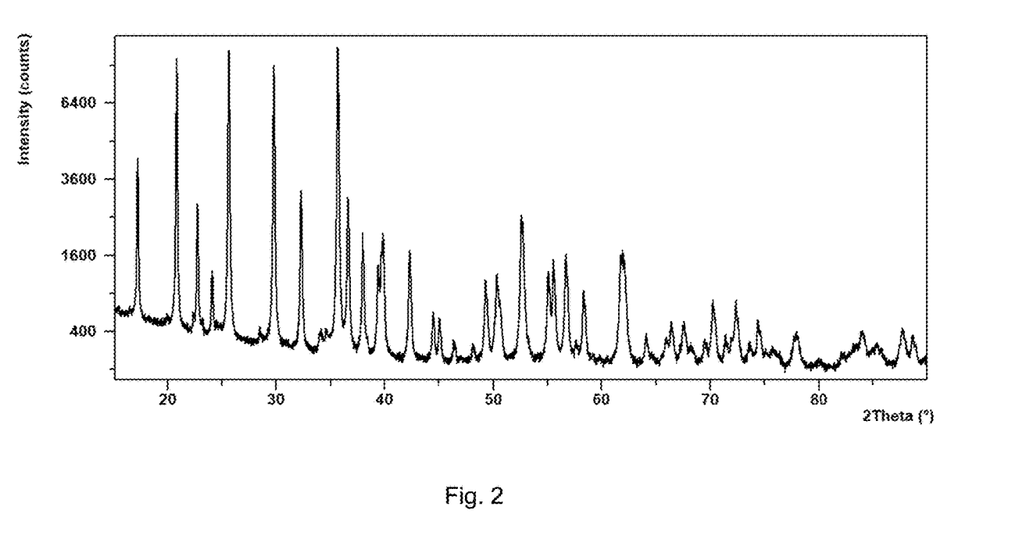
FIG. 2 is a powder XRD pattern of calcined inventive LiFePO$_4$/C cathode material.

FIG. 2 shows the powder XRD pattern of the $LiFePO_4/C$ material. All the main peaks index to an orthorhombic olivine structure indicating a standard $LiFePO_4$ phase. Observable peaks related to detrimental impurity phases common in traditional hydrothermal or solid state methods, such as $Li_4P_2O_7$, $Fe_2P$, $Fe_2P_2O_7$ etc., were not detected.

Figure 3:
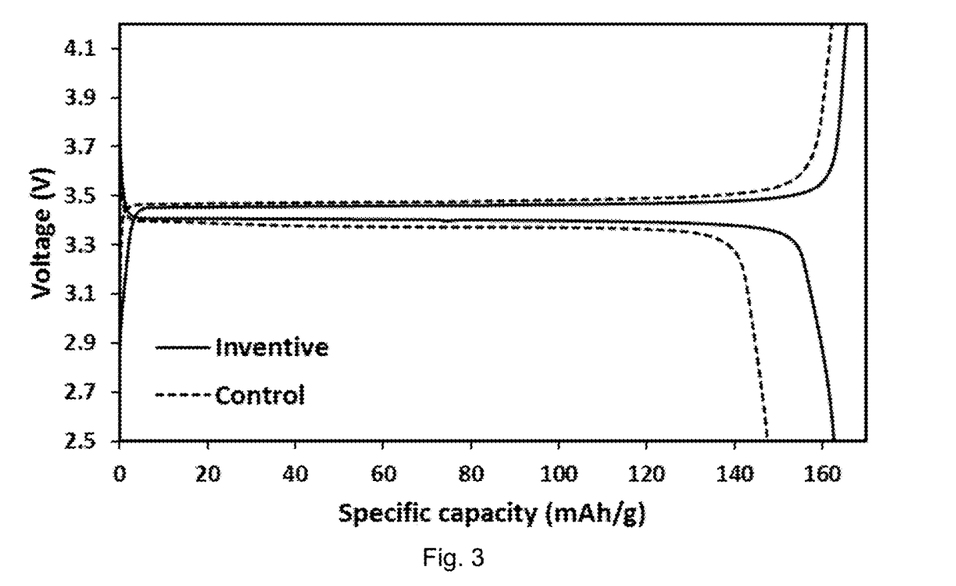
FIG. 3 is a graphical illustration of the charge/discharge profile of inventive LiFePO$_4$/C vs. a Li half-cell at 0.1C and 1C rates.

FIG. 3 shows the charge/discharge profile of $LiFePO_4/C$ vs. a Li half-cell at 0.1C rate vs. a commercial LFP material. The voltage plateau at approximately 3.4 V is attributed to the $Fe^{2+}/Fe^{3+}$ redox couple and intercalation/de-intercalation of $Li^+$ during the charge/discharge process. A specific discharge capacity of 162 mAh/g at 0.1C rate is achievable. FIG. 3 also shows a small difference between charge and discharge voltage plateau profile indicating low polarization and good reversibility.

Figure 4:
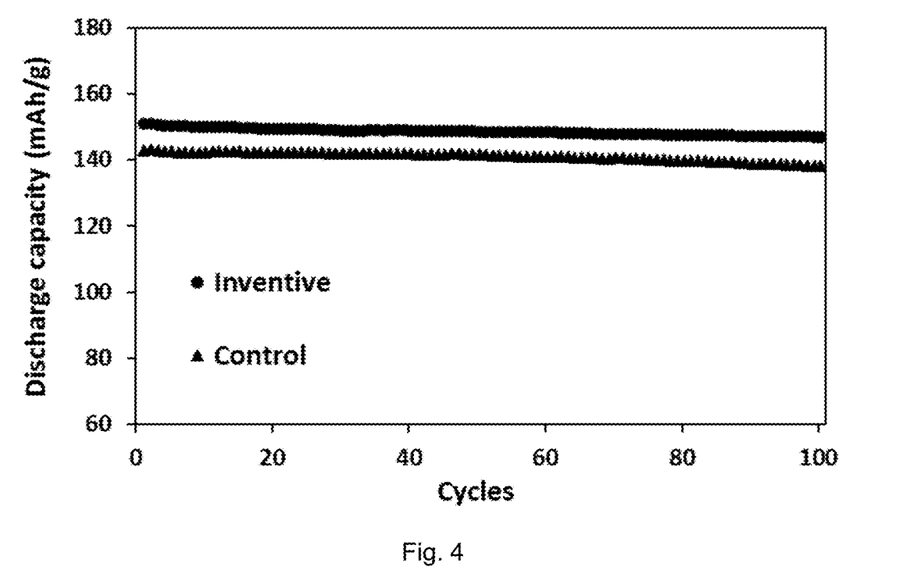
FIG. 4 is a graphical representation of the cycling of inventive LiFePO$_4$/C vs. a Li half-cell at 1C rate.
Figure 5:
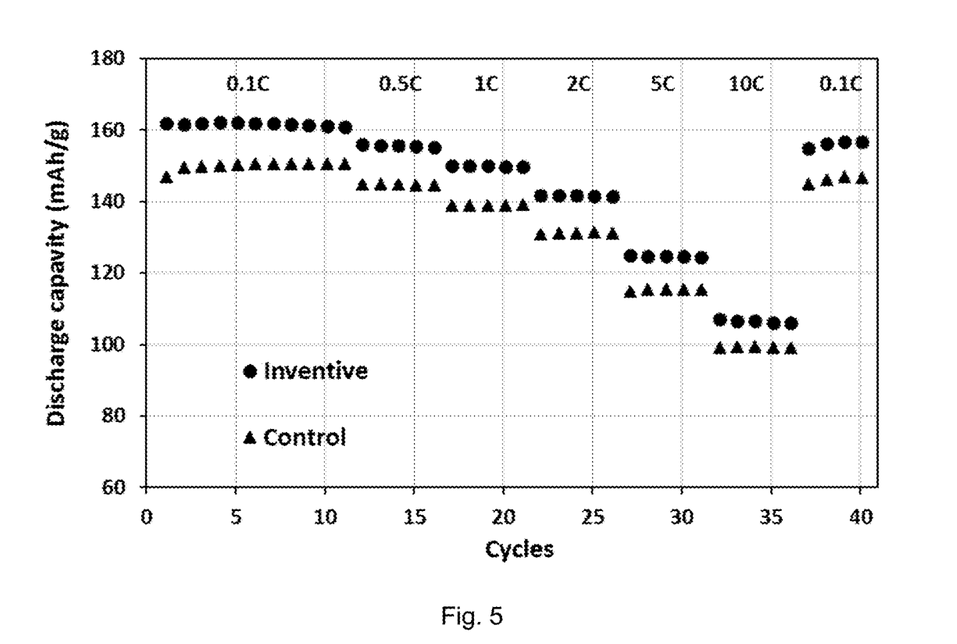
FIG. 5 is a graphical representation of the rate capability of inventive LiFePO$_4$/C vs. a commercial half cell at different current rates.

FIG. 4 shows the cycling performance of $LiFePO_4/C$ cathode materials at 1C rate versus the commercially available material. The cycling performance at 1C is very stable with almost no capacity fade. FIG. 5 shows the improved rate capability of the inventive material relative to the commercially available material wherein the inventive material is shown to achieve approximately 150 mAh/g at 1C, and 110 mAh/g at 10 C rates.

Figure 7:
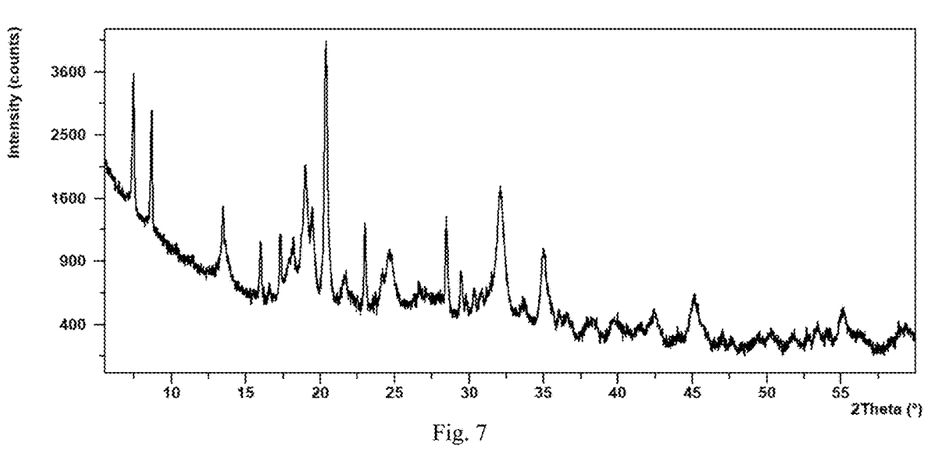
FIG. 7 is a powder XRD pattern of precursor material after drying.

FIG. 7 is a representative powder XRD pattern of a precursor material after drying.

Figure 8:
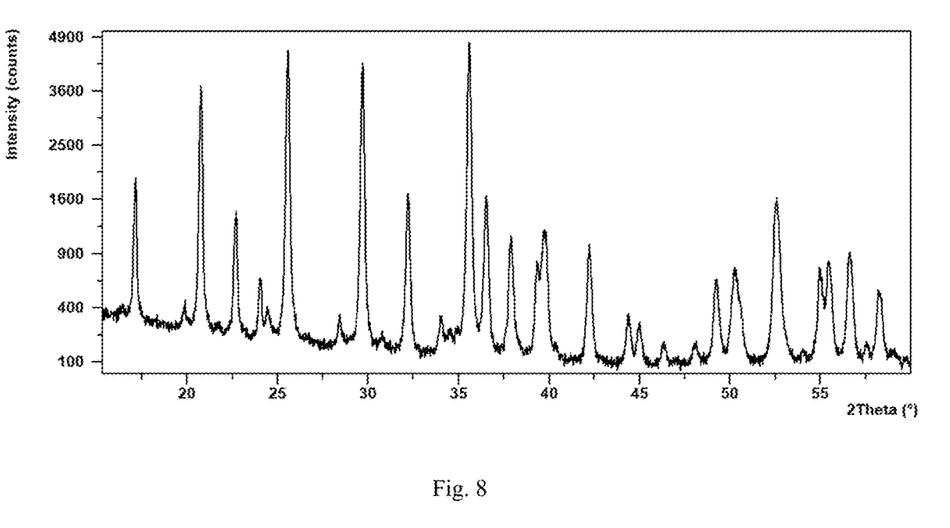
FIG. 8 is a powder XRD pattern of calcined inventive LiFePO$_4$/C cathode material.

FIG. 8 is a representative powder XRD pattern of calcined inventive $LiFePO_4/C$ cathode material.

Figure 9:
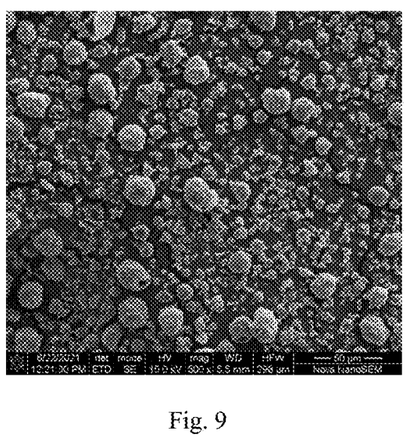
FIGS. 9 and 10 are SEM images of precursor materials after drying.
Figure 10:
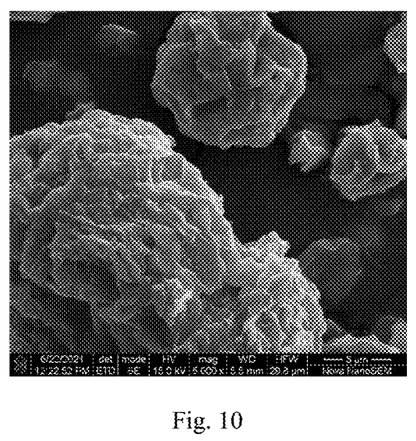

FIGS. 9 and 10 are representative SEM images of precursor materials after drying.

Figure 11:
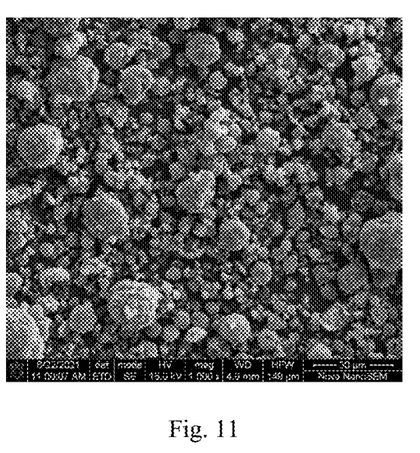
FIGS. 11 and 12 are SEM images of calcined inventive LiFePO$_4$/C cathode material.
Figure 12:
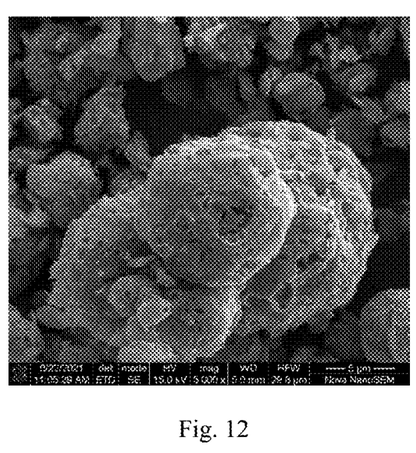

FIGS. 11 and 12 are representative SEM images of calcined inventive $LiFePO_4/C$ cathode material.

Figure 13:
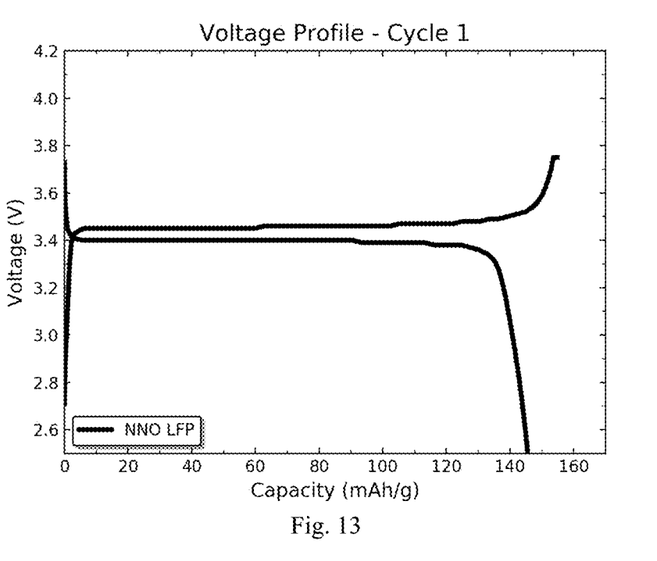
FIG. 13 is a graphical illustration of the charge/discharge profile of inventive LiFePO$_4$/C vs. a Li half-cell at 0.1C.

FIG. 13 is a graphical illustration of the charge/discharge profile of inventive $LiFePO_4/C$ vs. a Li half-cell at 0.1C.

Figure 14:
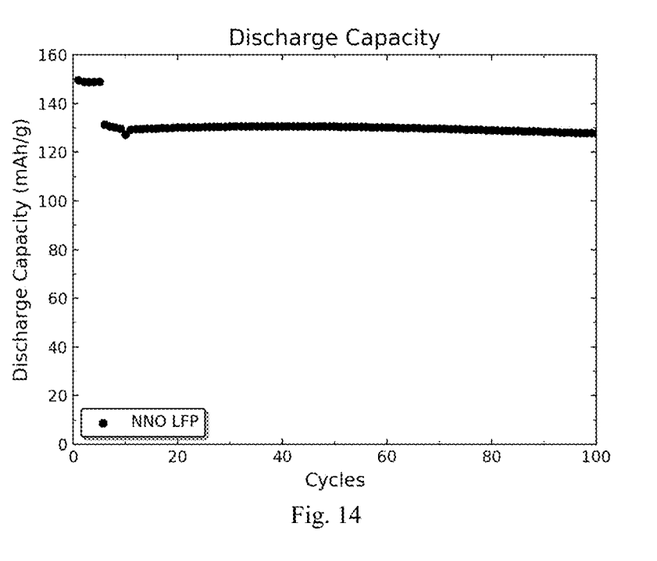
FIG. 14 is a graphical representation of the cycling of inventive LiFePO$_4$/C vs. a Li half-cell at 1C rate.

FIG. 14 is a graphical representation of the cycling of inventive $LiFePO_4/C$ vs. a Li half-cell at 1C rate.

Figure 15:
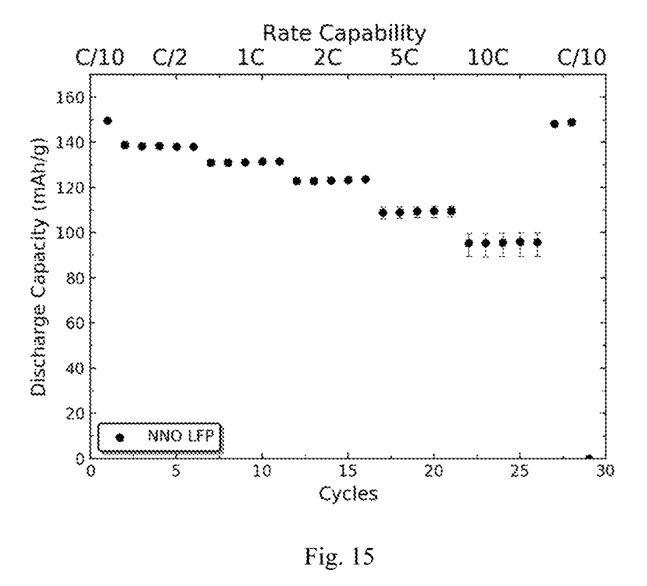
FIG. 15 is a graphical representation of the rate capability of inventive LiFePO$_4$/C vs. a commercial half cell at different current rates.

FIG. 15 is a graphical representation of the rate capability of inventive $LiFePO_4/C$ vs. a commercial half cell at different current rates.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A process for forming a lithium metal phosphate cathode material comprising:
   forming a first aqueous suspension comprising a metal source wherein said metal source comprises at least one iron source selected from the group consisting of FeOOH and $Fe_3O_4$ and an organic acid, organic alcohol or salt of an organic acid;
   wherein iron of said iron source is present in a first molar concentration;
   forming a second aqueous suspension comprising a second molar concentration of $PO_4^{3-}$;
   combining said first aqueous suspension and said second aqueous suspension followed by addition of a third aqueous suspension comprising a third molar concentration of $Li^+$;
   allowing a precipitate to form;
   drying said precipitate; and
   calcining said precipitate thereby forming said lithium iron phosphate cathode material having a formula represented by $LiMPO_4/C$ wherein said lithium iron phosphate cathode material comprises up to 3 wt % carbon; and
   further comprising wet milling of said precipitate prior to said drying wherein said wet milling comprises milling with 1-1.2 mm zirconia beads at a residence time of about 5-10 min/kg at a tip speed of about 10-15 m/s.

2. The process for forming a lithium metal phosphate cathode material of claim 1, wherein said iron source has less than 2000 ppm manganese.

3. The process for forming a lithium metal phosphate cathode material of claim 1, wherein said first molar concentration and said second molar concentration are in a ratio of 0.95:1 to 1.05:1.

4. The process for forming a lithium metal phosphate cathode material of claim 1, wherein said first molar concentration and said third molar concentration are in a ratio of 0.95:1 to 1.05:1.

5. The process for forming a lithium metal phosphate cathode material of claim 1, comprising forming said third aqueous suspension from lithium and carbonate.

6. The process for forming a lithium metal phosphate cathode material of claim 5, wherein said forming said third aqueous solution comprises forming a suspension comprising a material selected from the group consisting of $LiHCO_3$ and $Li_2CO_3$.

7. The process for forming a lithium metal phosphate cathode material of claim 6, wherein said $LiHCO_3$ is an in-situ reaction product of $Li_2CO_3$ and $CO_2$.

8. The process for forming a lithium metal phosphate cathode material of claim 1, wherein said forming of said second aqueous suspension comprises the addition of a phosphate material comprising at least one counterion selected from the group consisting of $NH_4^+$ and $H^+$.

9. The process for forming a lithium metal phosphate cathode material of claim 8, wherein said phosphate material is selected from the group consisting of $H_3PO_4$, $NH_4H_2PO_4$, $(NH_4)_2HPO_4$ and $(NH_4)_3PO_4$.

10. The process for forming a lithium metal phosphate cathode material of claim 9, wherein said phosphate material is $H_3PO_4$ or $(NH_4)_2HPO_4$.

11. The process for forming a lithium metal phosphate cathode material of claim 1, wherein said organic acid comprises at least one carboxylic group.

12. The process for forming a lithium metal phosphate cathode material of claim 1, wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, propane-1,2,3-tricarboxylic acid, sucrose and polyvinyl acid.

13. The process for forming a lithium metal phosphate cathode material of claim 12, wherein said organic acid is selected from the group consisting of oxalic acid, citric acid and sucrose.

14. The process for forming a lithium metal phosphate cathode material of claim 1, wherein said organic alcohol is polyvinyl alcohol.

15. The process for forming a lithium metal phosphate cathode material of claim 1, wherein said metal source further comprises at least one metal selected from the group consisting of nickel, manganese or cobalt.

16. The process for forming a lithium metal phosphate cathode material of claim 15, wherein said $LIMPO_4/C$ has the formula:

$$LiFe_xNi_aMn_yCo_zPO_4 \text{ wherein } x+a+y+z=1$$

wherein:
$0 \le x \le 1$;
$0 < y \le 1$;
$0 < z \le 1$; and
$0 < a \le 0.1$.

17. The process for forming a lithium metal phosphate cathode material of claim 16, wherein said $0.5 \le x \le 1$.

18. The process for forming a lithium metal phosphate cathode material of claim 17, wherein said $0.9 \le x \le 1$.

19. The process for forming a lithium metal phosphate cathode material of claim 16, wherein said $0 \le y \le 0.5$.

20. The process for forming a lithium metal phosphate cathode material of claim 16, wherein said $0 \le z \le 0.5$.

21. The process for forming a lithium metal phosphate cathode material of claim 1, wherein said carbon is a coating.

22. The process for forming a lithium metal phosphate cathode material of claim 1, comprising at least 1 wt % carbon.

23. The process for forming a lithium metal phosphate cathode material of claim 22, comprising no more than 2.5 wt % carbon.

24. The process for forming a lithium metal phosphate cathode material of claim 23, comprising 1.4 to 1.7 wt % carbon.

25. The process for forming a lithium metal phosphate cathode material of claim 1, wherein said allowing said precipitate to form comprises reacting for 5-24 hours.

26. The process for forming a lithium metal phosphate cathode material of claim 1, wherein said drying is selected from thin film drying and evaporative drying.

27. The process for forming a lithium metal phosphate cathode material of claim 26, wherein said evaporative drying comprises spray drying at an inlet temperature of 150° C. to 180° C.

28. The process for forming a lithium metal phosphate cathode material of claim 26, wherein said thin film drying comprises drying in a drum dryer wherein said drum dryer comprises a heated drum and an alternate heat source external to said drum.

29. The process for forming a lithium metal phosphate cathode material of claim 28, wherein said alternate heat source is selected from infrared, laser heat and UV heat.

30. The process for forming a lithium metal phosphate cathode material of claim 1, wherein said calcining is at a temperature of 620° C. to 740° C.

31. The process for forming a lithium metal phosphate cathode material of claim 1, wherein said calcining comprises rotating said powder during said drying.

32. The process for forming a lithium metal phosphate cathode material of claim 1, wherein said allowing said precipitate to form is in inert atmosphere.

33. The process for forming a lithium metal phosphate cathode material of claim 1, wherein said allowing said precipitate to form is not in inert atmosphere.

34. A process for forming a lithium metal phosphate cathode material comprising:
forming a first aqueous suspension comprising a metal selected from the group consisting of iron, nickel and manganese and an organic acid, organic alcohol or salt of an organic acid;
wherein said metal is present in a first molar concentration;
forming a second aqueous suspension comprising a second molar concentration of $PO_4^{3-}$;
combining said first aqueous suspension and said second aqueous suspension followed by addition of a third aqueous suspension comprising a third molar concentration of $Li^+$;
allowing a precipitate to form;
drying said precipitate; and
calcining said precipitate thereby forming said lithium metal phosphate cathode material having a formula represented by $LIMPO_4/C$ wherein said lithium metal phosphate cathode material comprises up to 3 wt % carbon; and
further comprising wet milling of said precipitate prior to said drying wherein said wet milling comprises milling with 1-1.2 mm zirconia beads at a residence time of about 5-10 min/kg at a tip speed of about 10-15 m/s.

35. The process for forming a lithium metal phosphate cathode material of claim 34, wherein said first molar concentration and said second molar concentration are in a ratio of 0.95:1 to 1.05:1.

36. The process for forming a lithium metal phosphate cathode material of claim 34, wherein said first molar concentration and said third molar concentration are in a ratio of 0.95:1 to 1.05:1.

37. The process for forming a lithium metal phosphate cathode material of claim 34, wherein said forming of said third aqueous suspension comprises the addition of a lithium material comprising lithium and carbonate.

38. The process for forming a lithium metal phosphate cathode material of claim 37, wherein said lithium material is selected from the group consisting of $LiHCO_3$ and $Li_2CO_3$.

39. The process for forming a lithium metal phosphate cathode material of claim 38, wherein said $LiHCO_3$ is an in-situ reaction product of $Li_2CO_3$ and $CO_2$.

40. The process for forming a lithium metal phosphate cathode material of claim 34, wherein said forming of said second aqueous suspension comprises the addition of a phosphate material comprising at least one counterion selected from the group consisting of $NH_4^+$ and $H^+$.

41. The process for forming a lithium metal phosphate cathode material of claim 40, wherein said phosphate material is selected from the group consisting of $H_3PO_4$, $NH_4H_2PO_4$, $(NH_4)_2HPO_4$ and $(NH_4)_3PO_4$.

42. The process for forming a lithium metal phosphate cathode material of claim 41, wherein said phosphate material is $H_3PO_4$ or $(NH_4)_2HPO_4$.

43. The process for forming a lithium metal phosphate cathode material of claim 34, wherein said organic acid comprises at least one carboxylic group.

44. The process for forming a lithium metal phosphate cathode material of claim 34, wherein said organic acid is selected from the group consisting of citric acid, oxalic acid, malonic acid, succinic acid, glutaric acid, adipic acid, pimelic acid, suberic acid, azelaic acid, sebacic acid, undecanedioc acid, dodecanedioc acid, citric acid, isocitric acid, aconitic acid, propane-1,2,3-tricarboxylic acid, sucrose and polyvinyl acid.

45. The process for forming a lithium metal phosphate cathode material of claim 44, wherein said organic acid is selected from the group consisting of oxalic acid, citric acid and sucrose.

46. The process for forming a lithium metal phosphate cathode material of claim 34, wherein said alcohol is polyvinyl alcohol.

47. The process for forming a lithium metal phosphate cathode material of claim 34, wherein said $LiMPO_4/C$ has the formula:

$$LiFe_xNi_aMn_yCo_zPO_4 \text{ wherein } x+a+y+z=1$$

wherein:
$0 \leq x \leq 1$;
$0 < y \leq 1$;
$0 < z \leq 1$; and
$0 < a \leq 0.1$.

48. The process for forming a lithium metal phosphate cathode material of claim 47, wherein said $0.5 \leq x \leq 1$.

49. The process for forming a lithium metal phosphate cathode material of claim 48, wherein said $0.9 \leq x \leq 1$.

50. The process for forming a lithium metal phosphate cathode material of claim 47, wherein said $0 \leq y \leq 0.5$.

51. The process for forming a lithium metal phosphate cathode material of claim 47, wherein said $0 \leq z \leq 0.5$.

52. The process for forming a lithium metal phosphate cathode material of claim 34, wherein said carbon is a coating.

53. The process for forming a lithium metal phosphate cathode material of claim 34, comprising at least 1 wt % carbon.

54. The process for forming a lithium metal phosphate cathode material of claim 53, comprising no more than 2.5 wt % carbon.

55. The process for forming a lithium metal phosphate cathode material of claim 54, comprising 1.4 to 1.7 wt % carbon.

56. The process for forming a lithium metal phosphate cathode material of claim 34, wherein said allowing said precipitate to form comprises reacting for 5-24 hours.

57. The process for forming a lithium metal phosphate cathode material of claim 34, wherein said calcining is at a temperature of 620° C. to 740° C.

58. The process for forming a lithium metal phosphate cathode material of claim 34, wherein said calcining comprises rotating said powder during said drying.

59. The process for forming a lithium metal phosphate cathode material of claim 34, wherein said allowing said precipitate to form is in inert atmosphere.

60. The process for forming a lithium metal phosphate cathode material of claim 34, wherein said allowing said precipitate to form is not in inert atmosphere.

61. The process for forming a lithium metal phosphate cathode material of claim 34, wherein said drying is selected from thin film drying and evaporative drying.

62. The process for forming a lithium metal phosphate cathode material of claim 34, wherein said evaporative drying comprises spray drying at an inlet temperature of 150° C. to 180° C.

63. The process for forming a lithium metal phosphate cathode material of claim 34, wherein said thin film drying comprises drying in a drum dryer wherein said drum dryer comprises a heated drum and an alternate heat source external to said drum.

64. The process for forming a lithium metal phosphate cathode material of claim 63, wherein said alternate heat source is selected from infrared, laser heat and UV heat.

\* \* \* \* \*